July 6, 1943. L. W. OLIVER 2,323,754
ILLUMINATION OF PHOTOGRAPHIC SCREEN
Filed Oct. 17, 1939 2 Sheets-Sheet 1
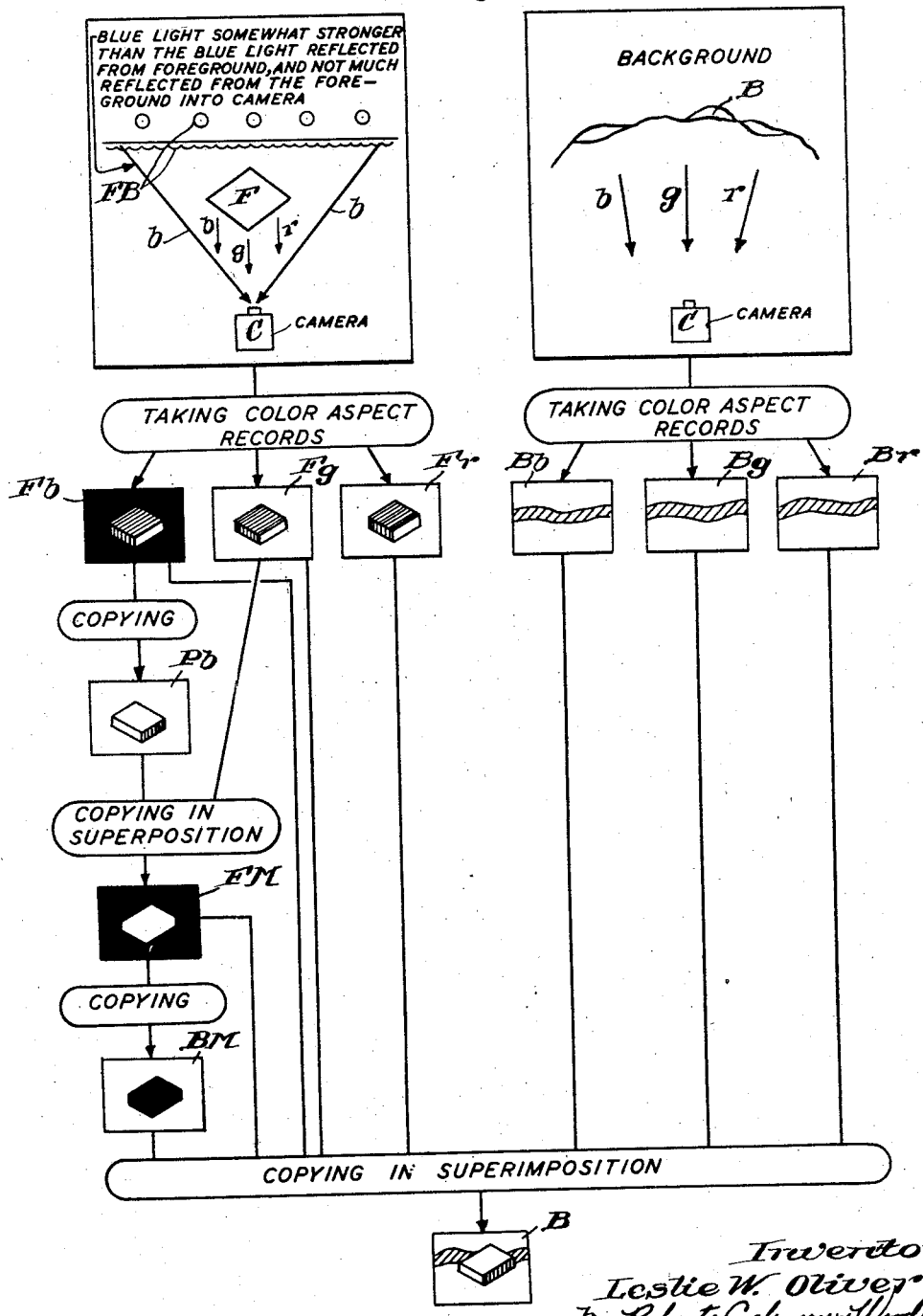

July 6, 1943.    L. W. OLIVER    2,323,754
ILLUMINATION OF PHOTOGRAPHIC SCREEN
Filed Oct. 17, 1939    2 Sheets-Sheet 2
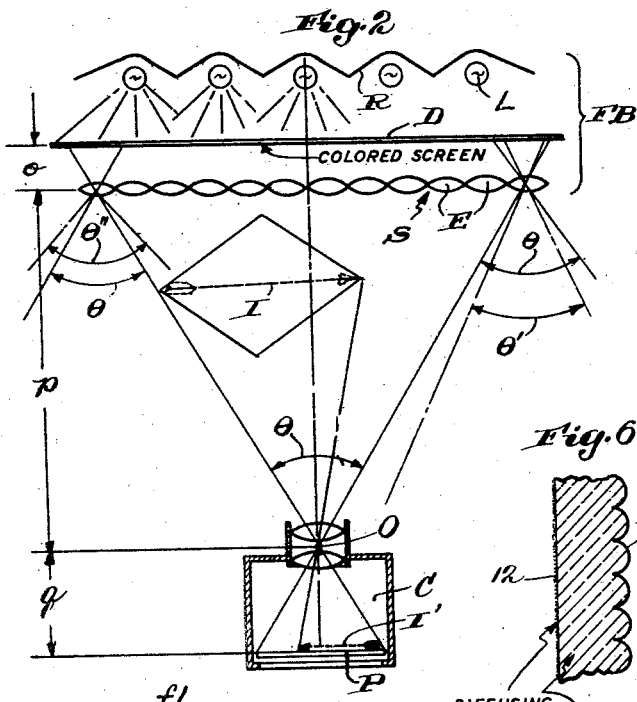
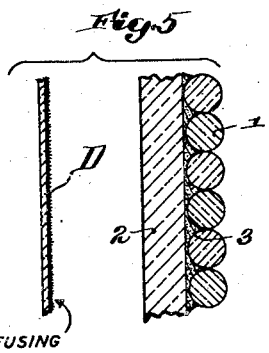
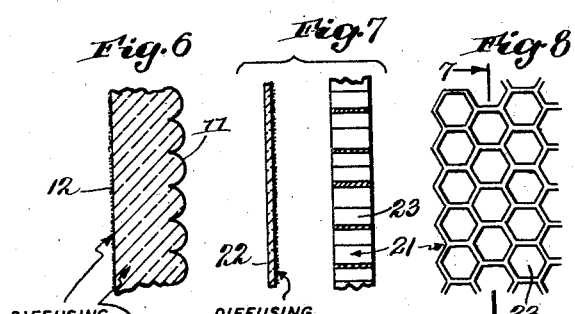
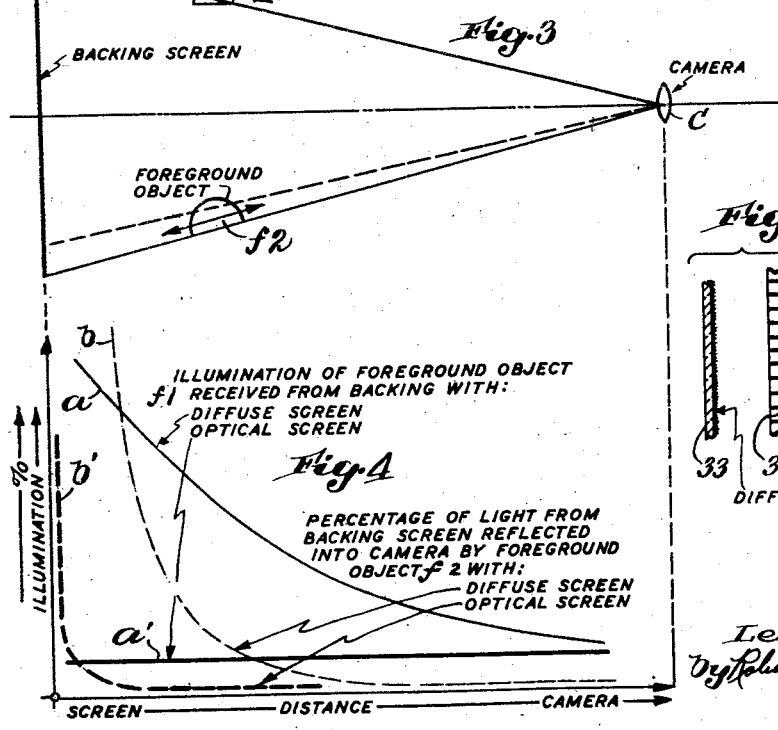
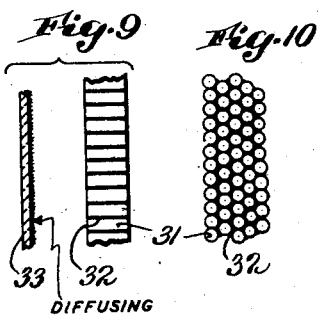

Patented July 6, 1943

2,323,754

UNITED STATES PATENT OFFICE 2,323,754

ILLUMINATION OF PHOTOGRAPHIC SCREENS

Leslie W. Oliver, Amersham, England, assignor to Technicolor Motion Picture Corporation, Los Angeles, Calif., a corporation of Maine Application October 17, 1939, Serial No. 299,829

9 Claims. (Cl. 95—5)

The present invention deals with the problem of directing a uniform light flux from a comparatively large surface into optical apparatus, and its principal object is to direct the light flux in such manner towards the apparatus that it is practically the same for any point of the surface; a complemental object is the illumination of the surface in a manner controlling the amount of light coming from the surface and reflected towards the apparatus by objects located between surface and apparatus.

The above problem may arise in various instances of the optical arts, but it was found to be of especial importance in the making of composite motion picture records as for example described in my Patent No. 2,277,141, dated March 24, 1942. This process involves the photographing of a foreground object against a uniformly colored backing surface. The foreground object field to be photographed as imaged by the photographic lens should be completely surrounded by a backing field uniformly illuminated with a spectral range of the illumination of the foreground object itself, at a level of illumination greater than that of any point of the foreground. On the other hand no greater level of illumination of the backing should be used than is necessary to satisfy the above condition. This is desirable because, with the wide aperture photographic objectives normally used in cinematography, any object of large area with a high level of illumination is liable to cause secondary images and scattered light to fall on the sensitive surface of the camera, thereby degrading the desired photographic image. Also, in order to provide clearly defined silhouette mattes for sharply differentiating background and foreground areas, no light whatever from the colored backing should reach any part of the foreground object as imaged by the lens. Further, the spectral range of the light falling on the sensitive surface from the backing should be carefully controlled so as to lack one or two of the spectral ranges recorded on the sensitive surface used depending, for example, on whether a yellow (minus blue) or blue backing is employed.

Summarizing the conditions desirable for the photography of a foreground object against a backing, light from the backing should be of a well defined color range not affecting at least one of the record negatives, and from any point of the surface of the backing material rays of light should leave that surface only at such an angle that they enter the photographic lens as far as possible directly and effecting uniform exposure over the entire backing area.

For practical purposes, these conditions can be realized by taking as a backing surface a flat sheet of transparent material integrally colored so as to transmit for example only tri-color blue light and having the surface remote from the camera matted to diffuse light falling on it from that side. The side facing the camera can be embossed with small lens elements so formed that each element transmits from the matted surface a cone of light of certain dimensions. In order to satisfy the condition that the illumination from the backing as viewed by the lens should be uniform (assuming that each lens element of the backing transmits a cone of light uniform in intensity at all points), the angles of the cones of light should be at least as large as the angle subtended at the lens by the longest dimension of the effective area of the sensitive surface to be exposed, as will later be explained in detail.

The reflection into the camera of backing light from surfaces of intermediate foreground objects is considerably decreased by using a system of the above indicated type, if the cones of light transmitted by the optical elements of the backing are just sufficiently large, but not larger, to fulfill the other condition of giving uniform illumination over the entire backing surface. A backing illumination of this character provides a very material advantage in both above respects, also allows an object to be photographed to be placed very close to the screen and offers the added advantage that the source of light for illuminating the backing can be placed behind the backing screen, so that it will not interfere with the arrangement of foreground objects.

Further objects of the invention are therefore to provide a system of light source, backing screen, foreground object and photographic apparatus which will provide a uniform intensity record of the backing and minimum reflection, at the foreground, of light from the backing, into the camera, and to provide transparent screens especially suited for that purpose.

These and other objects, aspects and features will be apparent from the description of several practical embodiments illustrating the genus of the invention by way of example, and referring to drawings in which Fig. 1 is a flow sheet explaining a process of color motion picture photography incorporating the present invention;

Fig. 2 is a diagrammatic plan of a motion picture taking set up according to the invention and illustrating how uniform light distribution is obtained according to the invention;

Figs. 3 and 4 are diagrams illustrating the effect of the invention with regard to reflection of backing light at the foreground; and Figs. 5 to 10 are sections through four different embodiments of backing screens according to the invention.

The above-mentioned process of composite motion picture photography will first be shortly recapitulated with reference to Fig. 1. This figure illustrates an embodiment of the invention which employs a backing sending forth light of a single-spectral range, for example blue light. FB is a foreground backing of the type according to the invention, sending blue light towards camera C. A foreground object F is illuminated with white light, care being taken that the blue light from the backing is at all points more intensive than the blue light from the foreground object, but also that this backing light is not so strong as to cause the above-mentioned undesirable effects. Three conventional color aspects Fb, Fg, Fr are then taken and developed, and a copy Pb made for example of the blue negative Fb. Negative Fg and positive Pb are then copied together, preferably according to the process described in my prior Patent 2,277,141, granted March 24, 1942. The silhouette foreground matte FM obtained in this manner is then copied to obtain a background matte BM. Three background negatives Bb, Bg and Br of a background B photographed with white light and the three foreground negatives Fb, Fg and Fr are then copied together as at length described in my above copending application; a combined special process positive B results.

The foreground backing FB used in the above process as improved by incorporating my present invention may consist, as indicated in Fig. 2, of a screen S composed of optical elements, for example small lenses E. Behind screen S is arranged at a distance o a second screen D, for example a sheet of opal or matte glass. This sheet D is illuminated from behind, for example with lamps L having reflectors R, and constituting a source of diffused light illuminating the back side of optical screen S as evenly as desirable for the purpose in question. It will be understood that this arrangement can be suitably modified in order to achieve the required degree of uniformity of illumination of the screen as viewed by the camera objective.

The taking camera C is placed at a distance p from the backing S representing an object surface. The film P, constituting the recording image surface of the camera, is at a distance q from the camera objective, in order to receive a sharp image of the foreground object as indicated by arrows I, I'.

As indicated in Fig. 2, the distance o from the lens elements to the diffusing screen D constituting a light source, is so chosen and the lenses are so dimensioned, that the beams projected against the camera aperture are subtending angles $\theta$ at the respective lens elements E. It will be noted that angles $\theta'$ which are smaller than angle $\theta$ which is subtended at the optical center O of the camera (or, generally speaking, the aperture of corresponding apparatus) by the longest dimension of the effective area of the recording surface (in practice the diagonal of a film frame), would provide a flux decreasing toward the margins of the screen. Assuming even light flux distribution within each beam, the smallest beam angle which will provide uniform illumination of the recording surface is an angle equal to angle $\theta$. Angle $\theta$ could be made greater, if it were not for the following situation.

As already pointed out, it is highly desirable that the reflection, at the foreground into the camera, of light from the backing, should be a minimum. Experiments have shown that the area illuminated from the backing, of a foreground object f1 (Fig. 3) placed between the camera and an ordinary diffusing screen varies as indicated at a of Fig. 4 upon moving the object between screen and camera. It was found that at a distance of one third from the screen somewhat less than half of the object as seen by the camera is illuminated by backing light. If an optical screen according to the invention is used, this undesired illumination is reduced to a practically constant minimum, as indicated by line $a'$ of Fig. 4. The reflection of backing light from a foreground object f2 was also tested; curve b of Fig. 4 indicates the amount of backing light reflected at the foreground object f2 into the camera for varying position of the foreground object between an ordinary diffusing screen and the camera. This illumination is reduced to a tolerable level at a distance of about one third from the screen. Curve $b'$ gives the analogous but much more favorable relation for an optical screen according to the invention. As was to be expected, it was further found that undesirable reflection of backing light from the foreground decreases with a diminishing angle $\theta''$ (Fig. 2) of the elementary beams from a screen according to the invention.

Since on the other hand, as above explained, uniform distribution of the light flux from the backing requires backing beam angles which are not smaller than $\theta$, it follows that beam angles which are approximately equal to angle $\theta$ (defined by the optical conditions involved), will provide the most favorable backing illumination.

It will now be evident that the light source for the backing illumination can be arranged behind the backing screen without interfering with the arrangement of foreground objects and without effecting direct illumination of the foreground with such light intended only for the backing.

A backing screen suitable for purposes of the invention can for example be constructed in the manner indicated in Fig. 5. This figure shows at 1 transparent polished glass spheres of about 3 mm diameter mounted on a sheet 2 of plain polished glass by embedding them in Canada balsam 3 so that approximately one-half of the spheres is covered, thus giving a screen effectively with one plain polished surface and the opposite surface composed of hemispherical elements of 3 mm diameter. With such a screen it was found that, if a source of uniformly diffused light consisting, for example, of a fully matted ground glass plate, is placed approximately 7 cm. behind this screen, each hemispherical element transmits a cone of light of an angle of approximately 60°. On the basis of this experiment, therefore, using two screens, one to provide the uniform source of illumination and the other to hold the hemispherical elements, the approximate ratio 1:20 was determined for the diameter of the spheres to the distance between the two screens, for a given photographic set up.

It may be preferable to make the size of the hemispherical elements as small as possible, consistent with obtaining the desired form. Such elements can be embossed on plastic material such as cellulose acetate, either by casting the material in sheets on a flat surface so engraved, or by subjecting sheets of suitable material to pressure between rollers also suitably engraved. If the elements are arranged to be sufficiently small so that the ratio found gives a desirable thickness of sheet for the practical purposes of handling and mounting, then the elements and the uniform surface of light can be incorporated on opposite sides of the same sheet. Such a screen is shown in Fig. 6, where 10 is the plastic screen with embossed lens elements 11 and a matted surface 12 constituting the light source.

If it is found desirable for the elements to be larger, then two sheets, suitably spaced, can be used. The elements are, of course, not necessarily hemispherical but any geometrical design can be used which will give the desired effect of uniform cones of light at the required angle.

Instead of using cemented or moulded lenticular screens as illustrated in Figs. 5 and 6, a tubular screen as shown in Figs. 7 and 8 may be used. In these figures, 21 is a grill placed in front of diffusing screen 22 and consisting of a plurality of small tubes 23 which, by internal reflection, define an angle θ of light beams penetrating the screen.

Still another modification of the optical screen, shown in Figs. 9 and 10, may consist of a plurality of light conducting rods 31 for example of Lucite, which are cemented together with black cement at 32. These are illuminated from a screen 33 serving as a source of light. It will be evident that a certain angle θ of the beams emerging from these rods can be determined by suitably selecting the length of rods 31 and the distance of screen 33 from the optical screen incorporating rods 31.

It should be understood that the present disclosure is for the purpose of illustration only and that this invention includes all modifications and equivalents which fall within the scope of the appended claims.

I claim:

1. Apparatus of the type described comprising an optical system with aperture and image surface, a source of light including an illuminating surface furnishing diffused light of substantially uniformly distributed flux density, and an object surface extending over said illuminating surface and imaged through said aperture with light from said illuminating surface, said object surface having a plurality of optical beam forming means directing said light into said optical system in substantially parallel beams whose angles are approximately equal to the angle subtended by the longest dimension of the effective area of said image surface at said aperture.

2. Optical arrangement comprising a photographic camera with objective and recording surface, a source of light including an illuminating surface furnishing diffused light of substantially uniformly distributed flux density, and a light transmitting backing extending over said illuminating surface between said surface and said camera, said backing having a plurality of optical beam forming means directing light from said illuminating surface into said camera in substantially parallel beams whose angles are approximately equal to the angle subtended by the longest dimension of the effective area of said recording surface at the optical center of said objective.

3. Optical arrangement comprising a photographic camera with lens and recording surface, a source of light including an illuminating surface furnishing diffused light of substantially uniformly distributed flux density, a backing extending over said illuminating surface and facing said lens, and on said backing optical beam forming means for projecting light from said illuminating surface towards said camera in beams which are substantially parallel and whose angles are approximately equal to the angle subtended at the optical center of said lens by the longest dimension of the effective area of said recording surface.

4. Optical arrangement comprising a photographic camera with lens and recording surface, a source of light including an illuminating surface furnishing diffused light of substantially uniformly distributed flux density, a backing extending over said illuminating surface between said surface and said camera, and on said backing optical beam forming means for projecting light from said illuminating surface towards said camera in substantially parallel beams whose angles are approximately equal to the angle subtended at the optical center of said lens by the longest dimension of the effective area of said recording.

5. In the art of photography the method of taking a scene against a backing which comprises illuminating one side of the backing with diffused light of substantially uniformly distributed flux, optically bundling said light flux at said backing into a plurality of substantially parallel beams with substantially uniform flux density in each beam, and exposing a scene at the other side of said backing in a taking camera directed at said scene and said backing in a position rendering the axes of said camera and of said beams substantially parallel and the angles subtended by said beams at said backing at least as large as the angle subtended at the camera aperture by the longest dimension of the photographically effective emulsion area of the camera.

6. In the art of photography the method of taking a scene against a backing which comprises illuminating one side of the backing with diffused light of substantially uniformly distributed flux, optically bundling said light flux at said backing into a plurality of substantially parallel beams with substantially uniform flux density in each beam, and exposing a scene at the other side of said backing in a taking camera directed at said scene and said backing in a position rendering the axes of said camera and of said beams substantially parallel and the angles subtended by said beams at said backing substantially equal to the angle subtended at the camera aperture by the longest dimension of the photographically effective emulsion area of the camera, whereby the light flux reaching the emulsion is substantially uniform over the backing area and the reflection of light from the backing at the scene into the camera is a minimum for the said uniform flux from the backing.

7. Apparatus of the type described comprising an optical system with aperture and image surface, a source of light including an illuminating surface furnishing diffused light of substantially uniformly distributed flux density, and an object surface extending over said illuminating surface and imaged through said aperture with light from said illuminating surface, said object surface having a plurality of optical lens means forming a substantially transparent screen for directing said light into said optical system in substantially parallel beams whose angles are approximately equal to the angle subtended by the longest dimension of the effective area of said image surface at said aperture.

8. Apparatus of the type described comprising an optical system with aperture and image surface, a source of light including an illuminating surface furnishing diffused light of substantially uniformly distributed flux density, and an object surface extending over said illuminating surface and imaged through said aperture with light from said illuminating surface, said object surface having a plurality of tubular elements forming a substantially transparent screen for directing said light into said optical system in substantially parallel beams whose angles are approximately equal to the angle subtended by the longest dimension of the effective area of said image surface at said aperture.

9. Apparatus of the type described comprising an optical system with aperture and image surface, a source of light including an illuminating surface furnishing diffused light of substantially uniformly distributed flux density, and an object surface extending over said illuminating surface and imaged through said aperture with light from said illuminating surface, said object surface having a plurality of light conducting rods forming a substantially transparent screen for directing said light into said optical system in substantially parallel beams whose angles are approximately equal to the angle subtended by the longest dimension of the effective area of said image surface at said aperture.

LESLIE W. OLIVER.